(12) United States Patent
Nagai

(10) Patent No.: US 9,727,942 B2
(45) Date of Patent: Aug. 8, 2017

(54) SELECTIVE UTILIZATION OF GRAPHICS PROCESSING UNIT (GPU) BASED ACCELERATION IN DATABASE MANAGEMENT

(71) Applicant: International Business Machines Corporation, Armonk, NY (US)

(72) Inventor: Norio Nagai, Palo Alto, CA (US)

(73) Assignee: International Business Machines Corporation, Armonk, NY (US)

(*) Notice: Subject to any disclaimer, the term of this patent is extended or adjusted under 35 U.S.C. 154(b) by 311 days.

(21) Appl. No.: 14/065,528

(22) Filed: Oct. 29, 2013

(65) Prior Publication Data

US 2015/0116340 A1    Apr. 30, 2015

(51) Int. Cl.
  *G06F 15/80* (2006.01)
  *G06T 1/20* (2006.01)
  (Continued)

(52) U.S. Cl.
  CPC .............. *G06T 1/20* (2013.01); *G06F 9/5044* (2013.01); *G06F 17/30442* (2013.01); *G06F 17/30519* (2013.01); *G06F 2209/509* (2013.01)

(58) Field of Classification Search
  CPC ........ G06F 9/5044; G06F 9/4881; G06F 9/50; G06F 9/505; G06F 17/30442; G06F 2209/501; G06F 11/3024; G06F 11/3409
  See application file for complete search history.

(56) References Cited

U.S. PATENT DOCUMENTS 8,762,366 B1 * 6/2014 Becerra ............. G06F 17/30463
                                                                    707/713
2010/0156888 A1   6/2010 Luk et al.
(Continued)

FOREIGN PATENT DOCUMENTS

CN   102819664 A   12/2012
CN   103124957 A    5/2013
(Continued)

OTHER PUBLICATIONS

Sebastian Breβ, et al., "Self-Tuning Distribution of DB-Operations on Hybrid CPU/GPU Platforms," Proceedings of the 24nd Workshop Grundlagen von Datenbanken (GvDB), 2012.
(Continued)

*Primary Examiner* — Hau Nguyen
(74) *Attorney, Agent, or Firm* — Steven M. Greenberg, Esq.; CRGO Law

(57) ABSTRACT

A method for the selective utilization of graphics processing unit (GPU) acceleration of database queries in database management is provided. The method includes receiving a database query in a database management system executing in memory of a host computing system. The method also includes estimating a time to complete processing of one or more operations of the database query using GPU accelerated computing in a GPU and also a time to complete processing of the operations using central processor unit (CPU) sequential computing of a CPU. Finally, the method includes routing the operations for processing using GPU accelerated computing if the estimated time to complete processing of the operations using GPU accelerated computing is less than an estimated time to complete processing of the operations using CPU sequential computing, but otherwise routing the operations for processing using CPU sequential computing.

10 Claims, 2 Drawing Sheets

(51) Int. Cl.
G06F 17/30 (2006.01)
G06F 9/50 (2006.01)

(56) References Cited

U.S. PATENT DOCUMENTS

| | | | |
|---|---|---|---|
| 2011/0040744 A1* | 2/2011 | Haas | G06F 17/30445 |
| | | | 707/713 |
| 2011/0161637 A1 | 6/2011 | Sihn et al. | |
| 2011/0264626 A1* | 10/2011 | Gautam | G06F 17/30445 |
| | | | 707/626 |
| 2012/0151190 A1 | 6/2012 | Usuba | |
| 2012/0259843 A1 | 10/2012 | Child | |

FOREIGN PATENT DOCUMENTS

| | | |
|---|---|---|
| CN | 103226540 A | 7/2013 |
| CN | 103713949 A | 4/2014 |
| TW | 200534088 | 10/2005 |
| TW | 201319822 | 5/2013 |

OTHER PUBLICATIONS

Yasuhito Ogata et al., "An Efficient, Model-Based CPU-GPU Heterogeneous FFT Library," IEEE, 2008. IPDPS, Apr. 14-18, 2008.

* cited by examiner

SELECTIVE UTILIZATION OF GRAPHICS PROCESSING UNIT (GPU) BASED ACCELERATION IN DATABASE MANAGEMENT

BACKGROUND OF THE INVENTION

Field of the Invention

The present invention relates to GPU acceleration and more particularly to GPU acceleration in database management.

Description of the Related Art

To provide faster video encoding than is possible on a central processing unit (CPU) alone, graphics display codecs have been developed to execute on GPUs. A GPU is a highly parallel processor capable of managing thousands of threads of execution simultaneously. By capitalizing upon the parallel processing capability of a GPU, video can be encoded faster in the video card while simultaneously offloading from the CPU of the host computing device those video processing tasks normally executed in the CPU. GPU computing extends beyond mere video processing in a graphics card and refers more generally to the use of a GPU together with a CPU to accelerate general-purpose applications.

Since its introduction, GPU computing has quickly become an industry standard, enjoyed by millions of users worldwide and adopted by virtually all computing vendors. To wit, GPU computing offers unprecedented application performance by offloading computing-intensive portions of the program code to the GPU from the CPU, while the non-computing intensive portions of the code remain for execution with the CPU. Consequently, from the end-user perspective, applications capitalizing upon GPU acceleration simply run faster.

Of note, the advantages of the GPU can be merged with the traditional capabilities of the CPU to achieve optimized execution of a computer program. Specifically, the combination of a CPU and a GPU can be powerful because the CPU consists of only a few processing cores optimized for serial processing, while the GPU consists of thousands of smaller, more efficient cores designed for parallel performance. As such, serial portions of program code execute in the CPU while parallel portions execute in the GPU.

Database applications like other applications benefit from the combined utilization of GPU acceleration and serial processing in a CPU. In this regard, it is known to apply GPU acceleration to a database system by executing parallelized operations in support of processing query against a database using a database server. The parallelized operations typically include a particular stored procedure available to the database server that includes a GPU executable and the particular stored procedure can be executed on one or more GPU devices. Alternatively, in a more limited implementation, a GPU-enabled database has been deployed as a scratch pad for accelerating database queries.

Nevertheless, the utilization of GPU acceleration in database management is not without consequence. Specifically, several major bottleneck factors affect the likelihood of success in the use of GPU acceleration, including memory transfer, array size, atomic operation, and device initialization. Depending upon conditions, database query processing using serialized CPU computing can outperform the performance GPU computing. Several approaches have been taken in order to address the variable performance of GPU computing in database management. One approach is the simple enhancement of hardware capabilities such as the addition of the number of processing cores available for use so as to provide greater parallel processing capabilities. As well, the bus bandwidth can be increased so as to mitigate memory transfer time. Another approach is to optimize the parallel computing algorithm to minimize processing time.

However, none of the foregoing approaches can be effective when a hardware system enjoys access to poor bandwidth; when the intended computation cannot be parallelized; or when the intended computation does not require enough processing cores to capitalize upon parallel processing in general. In such cases, the resource overhead associated with GPU computing detracts from any computational advantage of parallel computing.

BRIEF SUMMARY OF THE INVENTION

Embodiments of the present invention address deficiencies of the art in respect to GPU acceleration of database management and provide a novel and non-obvious method, system and computer program product for the selective utilization of GPU acceleration in database management. In an embodiment of the invention, a method for the selective utilization of GPU acceleration of database queries in database management is provided. The method includes receiving a database query in a database management system executing in memory of a host computing system. The method also includes estimating a time to complete processing of one or more operations requisite to the database query using GPU accelerated computing in a GPU and also a time to complete processing of the operations using central processor unit (CPU) sequential computing of a CPU. Finally, the method includes routing the operations for processing using GPU accelerated computing if the estimated time to complete processing of the operations of the database query using GPU accelerated computing is less than an estimated time to complete processing of the operations using CPU sequential computing, but otherwise routing the database query for processing using CPU sequential computing.

In one aspect of the embodiment, the estimated time to complete processing the operation or operations of the database query using GPU accelerated computing is based upon a characterization of the operation or operations of the database query as applied to a performance profile of the GPU. In this aspect, the performance profile of the GPU can include a number of GPU processing cores available in the GPU, a clock frequency of the GPU and a bandwidth available to support memory transfers from the GPU to host memory. Likewise, the characterization of the operation or operations of the database query includes a number of parallel computing threads required to process the operation or operations based upon an array size of data in one or more tables implicated by the database query, a number of the operations necessary to process the database query, and a number of atomic operations amongst the necessary operations of the database query.

In another embodiment of the invention, a database management data processing system is provided. The system includes a host computing system that includes at least one computer with memory and at least one processor. The system also includes a graphics card with a GPU and memory coupled to the host computing system. The system yet further includes a database management system executing in the memory of the host computing system managing query based access to data in one or more tables of a database. Finally, the system includes a selective GPU utilization module executing in connection with the database management system.

The module includes program code enabled to estimate a time to complete processing one or more operations requisite to a database query in the database management system using the GPU and also a time to complete processing of the database query using a CPU of the host computing system, and to route the operations of the database query for processing using the GPU if the estimated time to complete processing of the operations of the database query using the GPU is less than an estimated time to complete processing of the operations of the database query using the CPU, but otherwise routing the operations of the database query for processing using the CPU.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for selective utilization of GPU acceleration in database management. In accordance with an embodiment of the invention, a duration of processing of one or more operations of a database query utilizing GPU acceleration can be determined. For instance, one or more parameters involved in GPU acceleration can be inspected based upon the operations of the database query to estimate a time of completion of the operations of the query utilizing GPU acceleration. Concurrently, an estimated time of completion of the operations of the query utilizing CPU computing can be determined. If the estimated time to complete the operations of the query utilizing GPU acceleration bests that of CPU computing, GPU acceleration can be utilized in processing the operations of the query. Otherwise, CPU computing can be utilized in processing the operations of the query.

Figure 1:
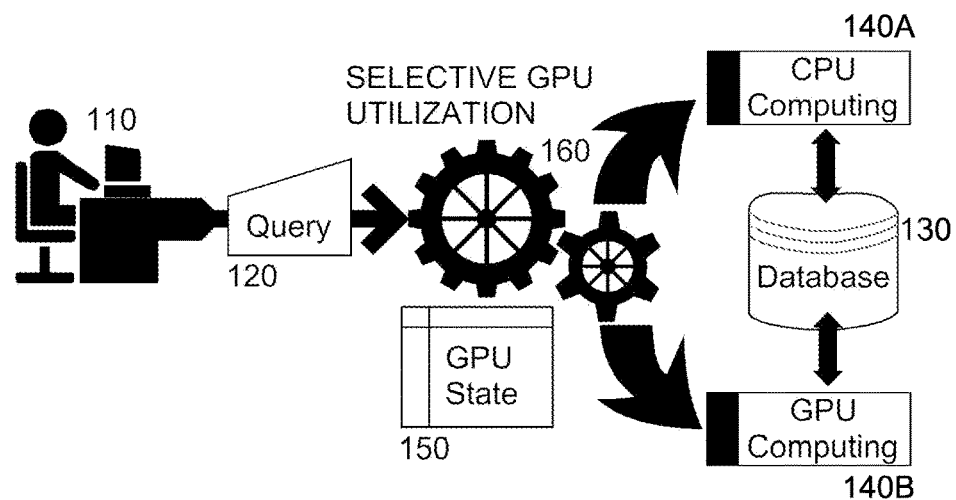
FIG. 1 is a pictorial illustration of a process for the selective utilization of GPU acceleration in database management.

In further illustration, FIG. 1 pictorially shows a process for the selective utilization of GPU acceleration in database management. As shown in FIG. 1, an end user 110 can submit a database query 120 for processing against one or more database tables in a database 130. Selective GPU utilization logic 160 can analyze one or more operations requisite to satisfy the query 120 in order to determine parallel computational characteristics of the operations, for example an array size of data in one or more tables implicated by the query 120, and a number of atomic ones of the operations requisite to processing the query 120 utilizing GPU computing 140B in a GPU. Thereafter, the selective GPU utilization logic 160 can compare the characteristics of the operations to a contemporaneous state of the GPU 150 to estimate a time to complete processing of the operations utilizing GPU computing 140B.

Concurrently, the selective GPU utilization logic 160 can estimate a time to complete execution of the operations of the query 120 should the operations of the query 120 be executed according to CPU computing 140A and not GPU computing 140B. If the selective GPU utilization logic 160 determines that the estimated time to complete execution of the operations of the query 120 with respect to CPU computing 140A exceeds that of GPU computing 140B, then the selective GPU utilization logic 160 can route the processing of the operations of the query 120 for processing by way of CPU computing 140A. Otherwise, the selective GPU utilization logic 160 can route the processing of the operations of the query 120 by way of GPU computing 140B.

Figure 2:
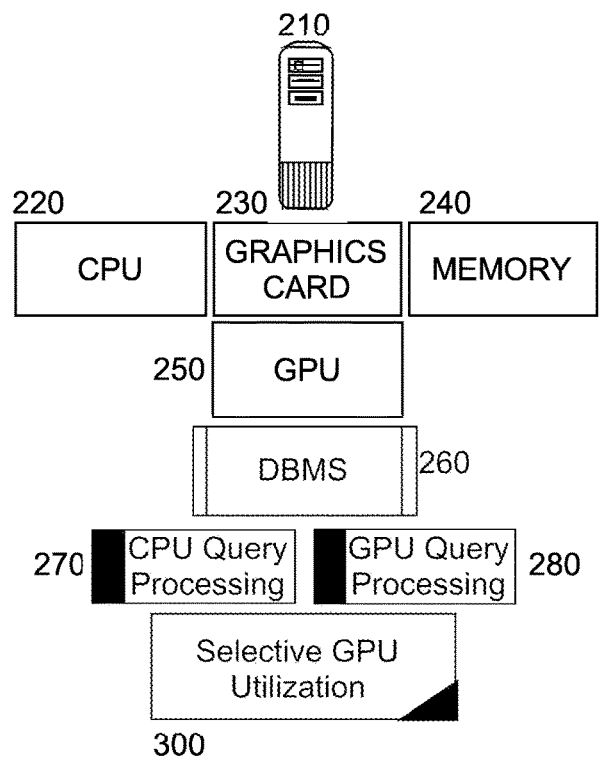
FIG. 2 is a schematic illustration of a database management data processing system configured for selective utilization of GPU acceleration in database management; and, FIG. 3 is a flow chart illustrating a process for selective utilization of GPU acceleration in database management.

The process described in connection with FIG. 1 can be implemented within a database management data processing system. In further illustration, FIG. 2 schematically shows a database management data processing system configured for selective utilization of GPU acceleration in database management. The system can include a host computing system 210 that can include one or more computers, each with at least one processor and memory. At least one of the computers can include a CPU 220 and memory 240. At least one of the computers also can include a graphics card 230 that includes a GPU 250.

The host computing system 210 can support the operation of a database management system 260. The database management system 260 can be configured to manage query based access to data in one or more tables of a database (not shown). The database management 260 in particular can be enabled to process the operations of a query to access the data in the tables of the database by way of conventional CPU query processing utilizing the CPU 220, or by way of GPU accelerated processing utilizing the GPU 250 of the graphics card 230. To that end, a selective GPU utilization module 300 can be coupled to the database management system 260 and can include program code configured to execute in the memory 240 of the host computing system 210.

The program code of the selective GPU utilization module 300 specifically can be enabled upon executing in the memory 240 to profile the GPU 250 by determining whether or not the GPU 250 has initialized, a number of GPU processing cores available in the GPU 250, a clock frequency of the GPU 250 and a bandwidth available to support memory transfers from the GPU 250 to memory 240. The program code of the module 300 additionally can be enabled upon executing in the memory 240 to characterize the requisite operations of a received query in the database management system 260. The characterization can include determining a number of parallel computing threads required to execute the operations of the query based upon an array size of data of one or more tables implicated by one or more of the operations of the query, the number of operations necessary to process the query, and a number of atomic operations amongst the necessary operations of the query.

The program code of the module 300 yet further can be enabled upon execution in the memory 240 to estimate a time to complete the query utilizing the GPU 250 and also utilizing the CPU 220. To the extent that the estimated time to complete the query utilizing the CPU 220 exceeds that of the GPU 250, the program code of the module 300 can be enabled to route the query for processing in the GPU 250. Otherwise, the program code of the module 300 can be enabled to route the query for processing in the CPU 220.

Figure 3:
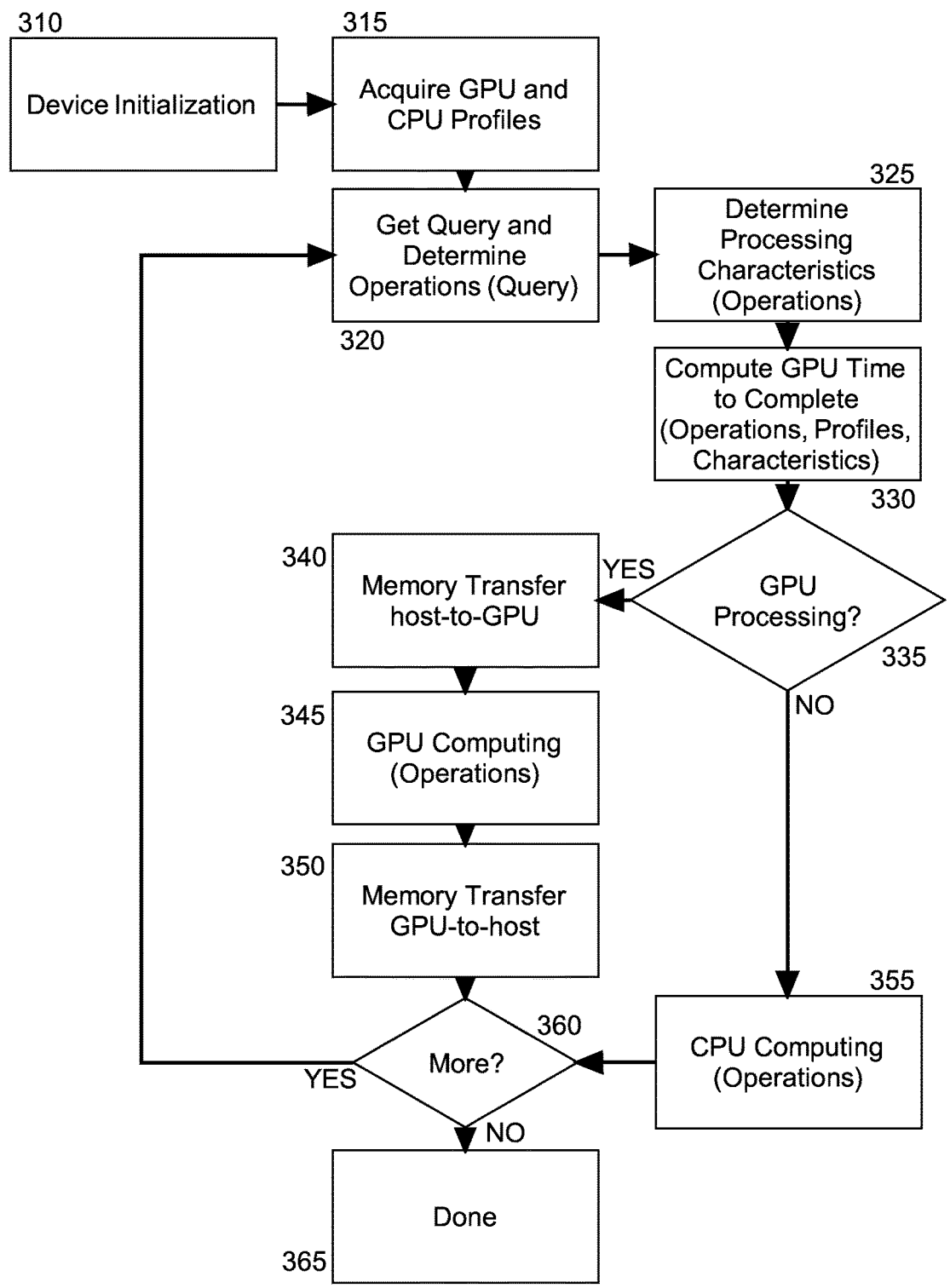

In even yet further illustration of the operation of the selective GPU utilization module 300, FIG. 3 is a flow chart illustrating a process for selective utilization of GPU acceleration in database management. Beginning in block 310, the GPU device can be initialized to parallel process operations resulting from data access queries in a database management system. In block 315 the performance profiles of each of the GPU and also the CPU can be determined, such as a number of GPU processing cores available in the GPU, a clock frequency of the GPU and a bandwidth available to support memory transfers from the GPU to host memory.

In block 320, a database query can be received in the database management system for processing and in block 325 different characteristics of one or more operations requisite to satisfying the database query can be determined. Those characteristics can include, for example, a number of parallel computing threads required to execute the operations of the query based upon an array size of data in one or more tables implicated by the query, the number of operations necessary to process the query, and a number of atomic operations amongst the necessary operations of the query. Subsequently, in block 330, the characteristics can be compared to the performance profiles of the CPU and the GPU in order to estimate in each case a time to complete processing of the operations of the database query.

In decision block 335, the estimated time to complete processing of the operations of the query in each of the CPU and GPU can be compared to determine whether or not processing the operations of the query in the GPU will result in a quicker completion of processing of the operations of the query. If not, the operations of the query can be processed in block 355 utilizing the CPU. Otherwise, in block 340 a memory transfer can be initiated to transfer the operations of the query to the memory associated with the GPU for GPU accelerated processing and in block 345, the operations of the query can be processed according to GPU computing. Thereafter, in block 350, the result set of the operations can be returned to the memory of the host computing system. In decision block 360, if additional database queries remain to be processed, the method can return to block 320. Otherwise, the process can end in block 365.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A database management data processing system comprising:
   a host computing system comprising at least one computer with memory and at least one processor;
   a graphics card with a graphics processing unit (GPU) and memory coupled to the host computing system;
   a database management system executing in the memory of the host computing system managing query based access to data in one or more tables of a database; and,
   a selective GPU utilization module executing on the at least one processor in connection with the database management system, the GPU utilization module comprising program code enabled to receive a database query in the database management system, to determine a set operations whose performance is required to process the query, to concurrently estimate both a time to complete processing of the determined set of operations of the database query in the database management system using the GPU and also a time to complete processing of the determined set of operations of the database query using a CPU of the host computing system, and based upon both concurrent estimates, to route the set of operations of the database query for processing using the GPU if the concurrently estimated time to complete processing of the set of operations of the database query using the GPU is less than the concurrently estimated time to complete processing of the set of operations of the database query using the CPU, but otherwise routing the set of operations of the database query for processing using the CPU.

2. The system of claim 1, wherein the estimated time to complete processing of the set of operations of the database query using the GPU is based upon a characterization of the set of operations of the database query as applied to a performance profile of the GPU.

3. The system of claim 2, wherein the performance profile of the GPU comprises a number of GPU processing cores available in the GPU, a clock frequency of the GPU and a bandwidth available to support memory transfers from the GPU to the memory of the host computing system.

4. The system of claim 2, wherein the characterization of the set of operations of the database query comprises a number of parallel computing threads required to process the operations of the database query, an array size of data in a table of the database implicated by the database query, a number of the operations necessary to process the database query, and a number of atomic operations amongst the necessary operations of the database query.

5. The system of claim 1, wherein the set of operations of the database query are routed for processing using the GPU by performing a memory transfer of the operations of the database query from the memory of the host computing system to the memory coupled to the GPU, and wherein a result set of the processing of the set of operations of the database query using the GPU is returned utilizing a memory transfer of the result set from the memory coupled to the GPU to the memory of the host computing system.

6. A computer program product for selective utilization of graphics processing unit (GPU) acceleration of database queries in database management, the computer program product comprising:
   a non-transitory computer readable storage medium having computer readable program code embodied therewith, the computer readable program code comprising:
   computer readable program code for receiving a database query in a database management system executing in memory of a host computing system;
   computer readable program code for determining a set operations whose performance is required to process the database query;
   computer readable program code for concurrently estimating both a time to complete processing of the determined set of operations of the database query using GPU accelerated computing in a GPU and also a time to complete processing of the determined set of operations of the database query using central processor unit (CPU) sequential computing of a CPU; and, computer readable program code for routing the set of operations of the database query for processing using GPU accelerated computing based upon both estimates if the concurrently estimated time to complete processing of the set of operations of the database query using GPU accelerated computing is less than the concurrently estimated time to complete processing of the set of operations of the database query using CPU sequential computing, but otherwise routing the set of operations of the database query for processing using CPU sequential computing.

7. The computer program product of claim 6, wherein the estimated time to complete processing the operations of the database query using GPU accelerated computing is based upon a characterization of the operations of the database query as applied to a performance profile of the GPU.

8. The computer program product of claim 7, wherein the performance profile of the GPU comprises a number of GPU processing cores available in the GPU, a clock frequency of the GPU and a bandwidth available to support memory transfers from the GPU to host memory.

9. The computer program product of claim 7, wherein the characterization of the set of operations of the database query comprises a number of parallel computing threads required to process the database query, an array size of data in a table of the database implicated by the database query, a number of the set of operations necessary to process the database query, and a number of atomic operations amongst the necessary set of operations of the database query.

10. The computer program product of claim 6, wherein the set of operations of the database query are routed for processing using GPU accelerated computing by performing a memory transfer of the set of operations of the database query from memory of the host computing system to memory associated with the GPU, and wherein a result set of the processing of the set of operations of the database query using GPU accelerated computing is returned utilizing a memory transfer of the result set from the memory associated with the GPU to the memory of the host computing system.

* * * * *